United States Patent
Kimball et al.

(10) Patent No.: US 7,451,663 B2
(45) Date of Patent: Nov. 18, 2008

(54) WEAR-RESISTANT FLOW METER TUBE

(75) Inventors: Douglas W. Kimball, New Albany, IN (US); Chad A. Juliot, New Albany, IN (US)

(73) Assignee: Kennametal Inc., Latrobe, PA (US)

( * ) Notice: Subject to any disclaimer, the term of this patent is extended or adjusted under 35 U.S.C. 154(b) by 77 days.

(21) Appl. No.: 11/512,944

(22) Filed: Aug. 30, 2006

(65) Prior Publication Data

US 2008/0053243 A1    Mar. 6, 2008

(51) Int. Cl.
*G01F 1/44* (2006.01)

(52) U.S. Cl. .................................................. 73/861.63

(58) Field of Classification Search ............... 73/861.63
See application file for complete search history.

(56) References Cited

U.S. PATENT DOCUMENTS

| | | | | |
|---|---|---|---|---|
| 2,766,621 A | * | 10/1956 | Raynsford et al. | 73/861.12 |
| 3,334,518 A | * | 8/1967 | Miyamichi | 73/861.12 |
| 3,743,556 A | | 7/1973 | Breton et al. | |
| 4,053,306 A | * | 10/1977 | Rodriguez | 420/119 |
| 4,194,040 A | | 3/1980 | Breton et al. | |
| 4,254,165 A | * | 3/1981 | Phelps et al. | 427/183 |
| 4,502,230 A | * | 3/1985 | Commer et al. | 34/594 |
| 5,164,247 A | | 11/1992 | Solanki et al. | |
| 5,236,116 A | | 8/1993 | Solanki et al. | |
| 5,352,526 A | | 10/1994 | Solanki et al. | |
| 5,542,873 A | * | 8/1996 | Shank, Jr. | 451/75 |
| 6,309,762 B1 | | 10/2001 | Speckert | |
| 6,474,250 B1 | | 11/2002 | Penterson et al. | |
| 6,539,981 B1 | * | 4/2003 | Kleven et al. | 138/143 |
| 6,649,682 B1 | | 11/2003 | Breton et al. | |

OTHER PUBLICATIONS

Brolick, H. J., "Black Mesa Pipeline—25 Year Success Story," Annual Meeting of the Canadian Institute of Mining, Metallurgy and Petroleum, Apr. 29, 1996.
Conforma Clad Inc., "Technical Bulletin—Standard Tungsten Carbide Cladding Formulas," GN-001 (2003).
Conforma Clad website www.conformaclad.com, Our Cladding (pp. 1-3); Technology (pp. 1-2); Flexible Cloth (pp. 1-5); Oilfield (pp. 1-5), 2006.
Koerner, Brendan I., "The Trillion Dollar Tar Pit," Wired Magazine, Issue 12.07—Jul. 2004.
Syncrude website, www.syncrude.ca, 6 pages, 2006.
"GIW All-Metal Pumps Applied in Tailings and Hydrotransport," www.giwindustries.com/cases_oil.html.
Application Bulletin, "Riley Power CCV® Burner Components," Conforma Clad, a Kennametal Company, 4 pages, 2006.

(Continued)

*Primary Examiner*—Harshad Patel
(74) *Attorney, Agent, or Firm*—Matthew W. Smith

(57) ABSTRACT

A flow meter tube is provided having improved performance in the measurement of the flow rate of erosive material. The internal wall surface of the flow meter tube has a smooth erosion-resistant coating thereon to protect the flow meter wall from erosion by the erosive fluid flowing there through. The coating has a Rockwell C hardness of 56 to 70 and a surface roughness of less than or equal to 250 microinches rms.

9 Claims, 4 Drawing Sheets

OTHER PUBLICATIONS

Technical Publication, Courtemanche, Bonnie, P.E. et al., "CCV® Components and Overfire Air Improve Existing First Generation Low $NO_x$ Burner Emissions," Presented Apr. 5-7, 2005, Electric Power 2005, Chicago, IL, and Apr. 17-21, 2005, International Technical Conference on Coal Utilization and Fuel Systems, Clearwater, FL, published 2005, Riley Power Inc., 13 pages.

"Process Controls" http://wwwo.processcontrolscorp.com/theorgy.htm (pp. 1-2) May 7, 2008.

"Fundamental principles of Electromagnetic Flow Measurement" 3rd Edition, Friedrich Hofmann, Krohn Messtechnik GmbH & Co. KG Gulsburg, Nov. 2003.

* cited by examiner

WEAR-RESISTANT FLOW METER TUBE

The present invention relates to flow meters, particularly those used to handle gases and/or fluids having entrained erosive material therein.

BACKGROUND OF THE INVENTION

Venturi flow meters are used to measure the flow rates of fluids (gas, liquids and their mixtures with each other and particulates). Where the fluid has an erosive characteristic, it rapidly wears the venturi, changing its dimensions and shape, leading to inaccurate measurements of flow rate. In the past, this problem was attempted to be addressed by applying a weld overlay material to the interior surfaces of the venturi meter which are subject to wear. These materials (which typically contain chromium carbide or tungsten carbide), while having higher wear resistance than the underlying steel or cast iron of the venturi meter walls, have a very rough surface. The rough surface is caused by the method of coating application, a series of weld beads, resulting in a bumpy surface. In addition, in order to produce beneficial improvements in wear lifetime, these materials had to be applied in average thicknesses of about 0.250 to 0.375 inch. These relatively thick and very rough coatings also adversely affected the accuracy of the flow rate measured. Roughness produces inaccuracy in the flow measurement. The high thickness of the coating is required to get to reasonable lifetime because of the wear rate of the coating. As the coating wore, again the accuracy of the venturi was affected since the wear is non-uniform and the shape of the venturi is altered.

A diametric cross section through an example of a prior art venturi flow meter tube 10 is shown in FIG. 1. It has an erosive fluid flowing through it along axis AA in the direction shown by arrows B. The fluid enters from pipe (not shown) into the inlet section 12 of the venturi 10. It then flows through the throat section 16 of the venturi into the outlet section 14, which has a constant diameter section 15 followed by a diverging section 17. The venturi is formed by a wall 22 (typically cast iron or steel). Formed at both ends of the venturi are flanges 23, 25 for attachment to piping (not shown) at the inlet and outlet. In order to measure fluid flow through the venturi flow meter tube, pressure taps 18 and 20 for measuring pressure are provided through the wall 22 and weld overlay 24 of the venturi 10 at its inlet section 12 and outlet section 16.

When the flowing fluid is highly abrasive or erosive, the wall 22 may be coated with a weld overlay 24 to increase the wear resistance and therefore the life of the venturi tube flow meter 10. FIG. 2 shows a partial cross section through the venturi flow meter tube of FIG. 1. It can be seen that the weld beads 26 cause the surface 28 of the weld overlay coating 24 to be very rough.

For example, in the mining and refining of oil sands, the oil sand is first crushed and then transported via hydrotransport to a bitumen extraction facility. In hydrotransport, the crushed oil sand is mixed with hot water to form a slurry which is pumped through a pipe to the extraction facility. This slurry is highly erosive, particularly to the flow meters in the pipeline. Similar erosion conditions are also encountered in other industrial applications such as in coal slurry pipelines (See: Brolick, "Black Mesa Pipeline—25 Year Success Story," Annual Meeting of the Canadian Institute of Mining, Metallurgy and Petroleum, Apr. 29, 1996). Further examples of highly erosive fluids requiring flow rate monitoring include slurries of ores, and/or minerals, and slurries of mine tailings, and fluids containing other waste products.

There is therefore a need for a flow meter capable of accurately measuring the flow rates of erosive fluids.

SUMMARY OF THE INVENTION

The inventors have provided a flow meter tube having a wall with an internal coating of a wear-resistant material having a surface roughness of less than or equal to 250 microinches rms (root mean square) and a Rockwell C hardness of 56 to 70. Preferably, the coating has a thickness in the range of 0.015 to 0.120 inch.

Preferably, the coating has an erosion rate of 0.041 $mm^3/g$ or less and more preferably 0.025 $mm^3/g$ or less (per ASTM G76).

Preferably, the coating has an abrasion resistance factor of at least 100 and more preferably at least 140 (1/volume loss ($cm^3$) (ASTM G65).

These and other aspects of the invention will become more apparent upon review of the drawings, which are briefly described below, in conjunction with the detailed description of the invention.

DETAILED DESCRIPTION OF THE INVENTION

Figure 1:
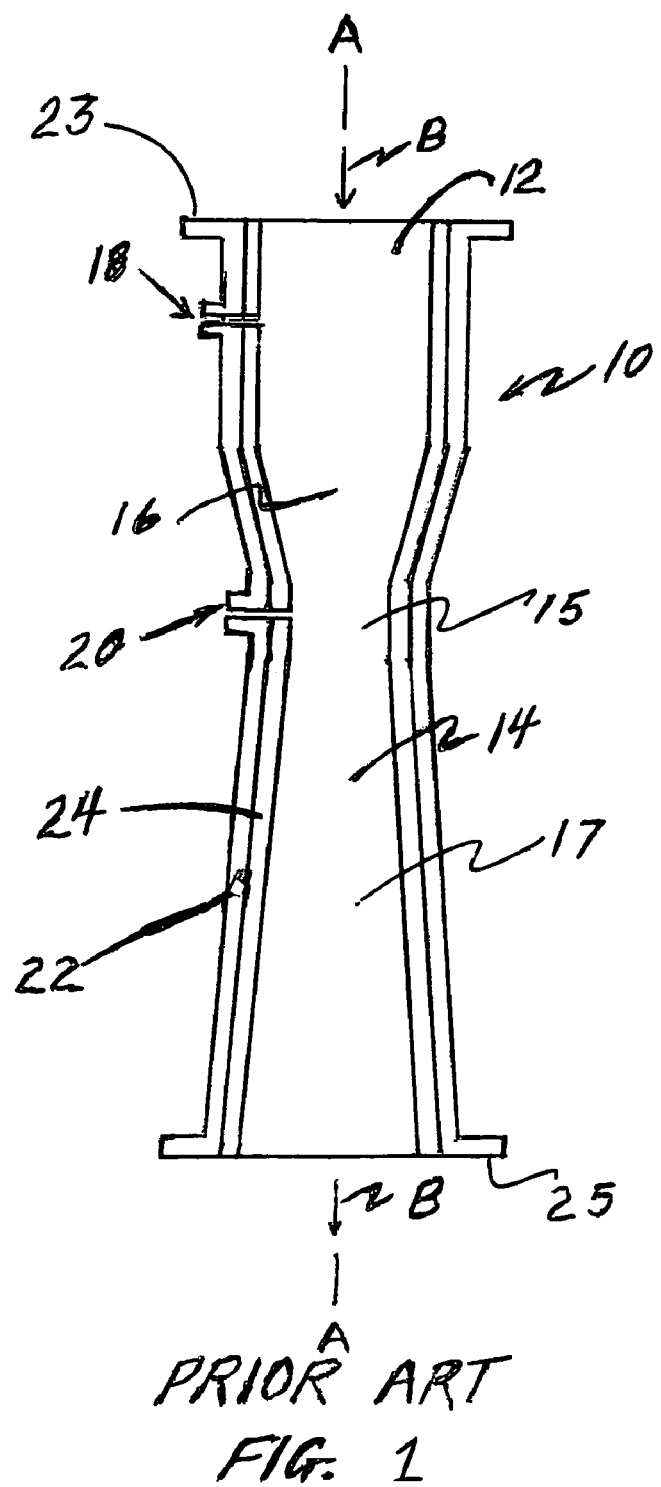
FIG. 1 shows a cross section, along a diameter, of an embodiment of prior art venturi flow meter tube having a weld overlay hard facing on its inside wall.
Figure 2:
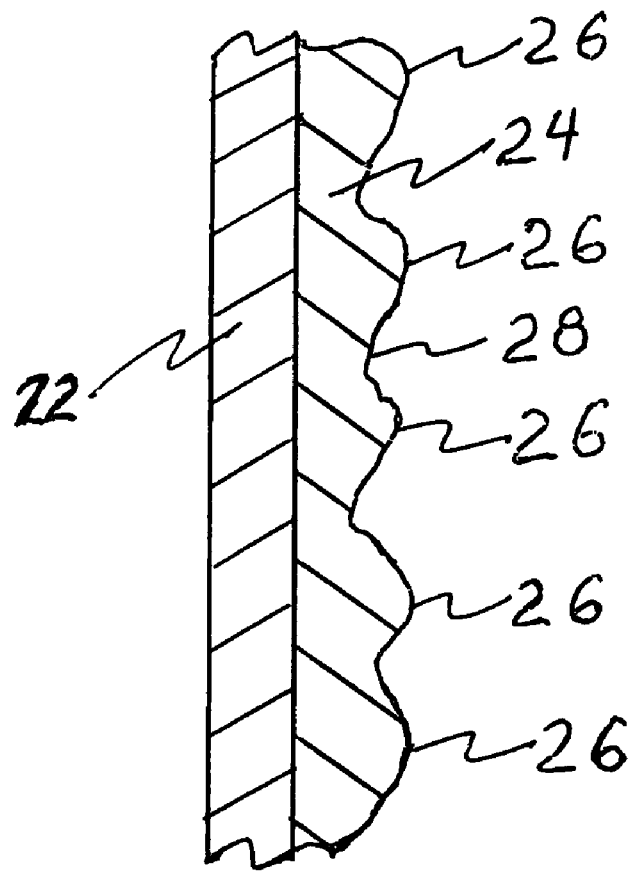
FIG. 2 shows a partial longitudinal cross section taken in plane containing axis AA of FIG. 1.
Figure 3:
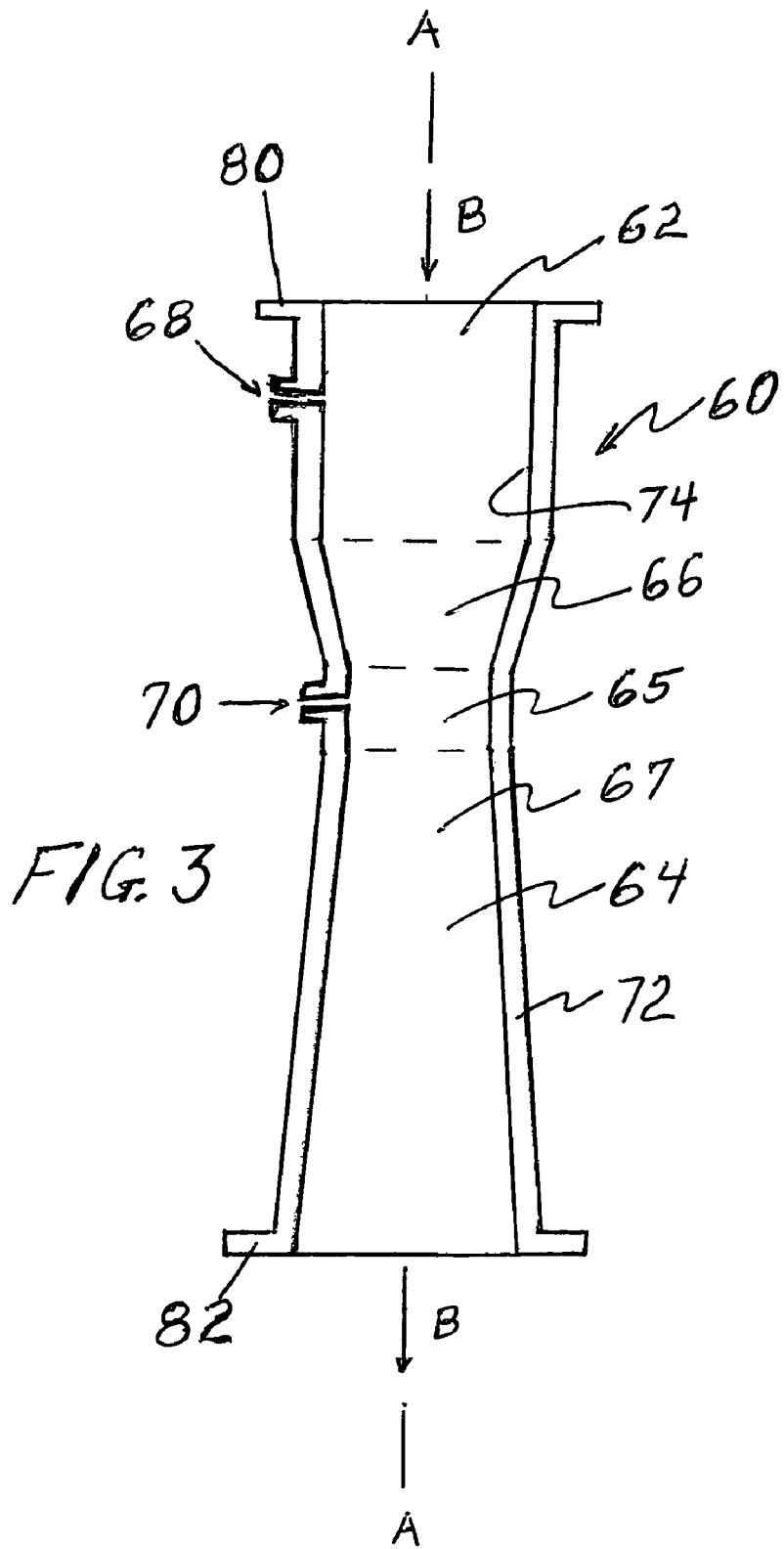
FIG. 3 shows a cross section, along a diameter, of an embodiment of a venturi flow meter tube in accordance with the present invention.
Figure 4:
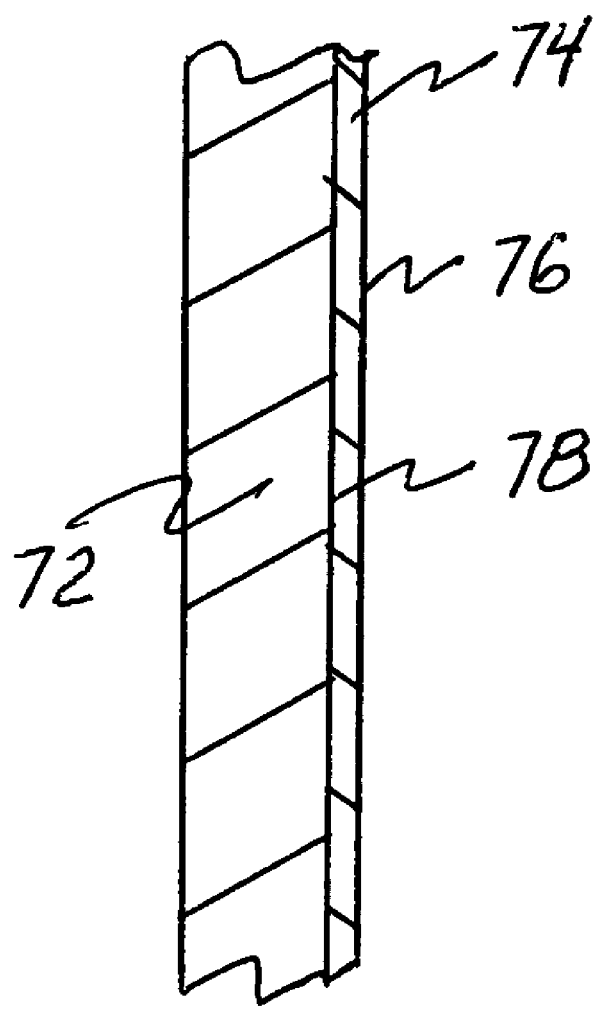
FIG. 4 shows a partial longitudinal cross section taken in a plane containing axis AA of FIG. 3.

FIG. 3 shows a diametric cross section through a preferred embodiment of venturi flow meter tube 60 in accordance with the present invention. It has an inlet section 62, adjoining a throat or converging section 66, followed by an outlet section 64. Outlet section 64 has a first or upstream section 65 with a constant cross sectional area along its length, and a second or downstream section 67 whose cross sectional area increases in the direction of flow B. Pressure taps 68 and 72 for determining flow rate are respectively located at the inlet section 62 and the outlet section 64 where they pierce wall 72. Wall 72 defines the shape of the venturi flow meter tube 60. The wall is typically made of steel or cast iron. It may be made in one piece or sections which are welded together. The inside surface of wall 72 has an erosion-resistant coating 74 thereon, which is more clearly shown in the FIG. 4 cross-sectional view. The coating 74 is a relatively thin and smooth coating compared to the prior art thick, bumpy weld overlay coating 24. It may be in thickness of 0.015 to 0.120 inch, depending on the severity of the erosive environment. Preferably, it has a thickness of 0.030 to 0.090, more preferably 0.030 to 0.080, and most preferably 0.045 to 0.075 inch for oil sand applications. It has improved abrasion and erosion resistance, compared to weld overlays used in the prior art. The roughness of the surface 76 of the coating 74 has a roughness no greater than 250 microinches rms. The preferred coating is autogenously metallurgically bonded to the wall 72 at the bond line 78 between the wall and the coating. The coating 74 is preferably comprised of 42 to 68 weight percent tungsten carbide (a mixture of cobalt cemented tungsten carbide particles and tungsten carbide particles) and has a Rockwell C hardness 56 to 70. These hard particles are uniformly distributed and embedded in a corrosion-resistant matrix of an alloy including nickel and chromium. Preferably the Rockwell C hardness of the coating is 64-70 and the tungsten carbide loading is 58 to 66 weight percent. A preferred coating material is Conforma Clad® WC 200 brazed cladding in a nominal thickness of about 0.060 inch. WC 200 has a nominal composition of about (in weight percent): 65 tungsten carbide, 30 nickel, 5 chromium, 1.5 boron, 3 cobalt, and 0.3 iron. WC 200 cladding has the following nominal properties:

Density: 0.44 lb/in$^3$
Thermal Conductivity: 230 (BTU·in/h·ft$^2$·°F)
Metallurgical Bond:
   Strength: >70,000 psi
   Porosity: <3%
Rockwell C Hardness: 64-70
Abrasion Resistance Factor:
   (ARF)=1/volume loss (cm3): 157
(Dry Sand Abrasion Test:
   ASTM G65)
Erosion Rate (mm$^3$/g): 0.023
(ASTM G76
   45° impingement angle,
   83 m/s, Alumina <63 μm)

In comparison, tungsten carbide and chromium carbide weld overlays typically have an abrasion resistance factor of 70-100 and 40-50 (ASTM G65), respectively. Chromium carbide weld overlay has an erosion rate of 0.063 to 0.079 (ASTM G76), respectively. (See: Conforma Clad Inc., "Technical Bulletin—Standard Tungsten Carbide Cladding Formulas," GN-001 [2003].) The method of application of the wear-resistant coating is described in U.S. Pat. No. 3,743,556 to Breton et al. The '556 Breton et al. patent discloses a process for applying a wear-resistant coating that first applies a cloth that contains particles of tungsten carbide to a surface that requires protection against wear. Second, another piece of cloth that contains particles of a braze alloy is positioned over the cloth that contains the carbide particles. The substrate with the two layers of cloth is placed in an inert-atmosphere furnace and then heated to the brazing temperature of the braze alloy. The braze alloy infiltrates down into the carbide particles and brazes them to each other and to the substrate. (See also: U.S. Pat. Nos. 4,194,040; 5,164,247; and 5,352,526.) Alternatively, the hard particles and braze material may be painted onto the wall and then brazed as described in U.S. Pat. No. 6,649,682. In the application of Conforma Clad cladding to the interior of a venturi flow meter tube, the pressure taps should not penetrate to the interior surface of the wall 72 prior to coating. After coating, the openings for the pressure taps are EDM machined through the coating 74 and the wall 72.

Where the venturi flow meter tube is made in sections, if necessary, the coating may be applied prior to welding the sections together. In that case, any gaps in the cladding in the welded areas will be subsequently protected with hard facing.

The flow meter tube 60, in accordance with the present invention, is connected into a system or pipeline through which an erosive fluid is flowing via upstream flange 80 and downstream flange 82 which may be bolted or welded onto the pipes in the line (not shown). The erosive fluid flowing through the flow meter tube 60, in direction B, has a significantly reduced impact on the accuracy of the flow meter since the coating 74 is smooth and highly erosion resistant and therefore wears at a much reduced rate compared to the prior art. In addition, because of its smoothness and uniform metallurgical structure, it can wear relatively uniformly compared to the prior art, thus minimizing unpredictable changes to the internal shape of the flow meter tube.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A flowmeter tube for use in measuring the flow rate of erosive materials, the flowmeter tube comprising:
   a tube having a wall forming an inlet section having a first cross sectional area for receiving flowing erosive materials and an outlet section having a second cross sectional area for receiving said flowing erosive materials from the inlet portion;
   wherein the first cross sectional area is larger than said second cross sectional area;
   a first pressure tap communicating with said inlet section;
   a second pressure tap communicating with said outlet section;
   said wall having an inside coating of tungsten carbide cemented by a nickel chromium alloy;
   said coating metallurgically bonded to said wall and having a hardness of Rockwell 56 to 70 and a surface roughness of less than or equal to 250 microinches rms.

2. The flowmeter according to claim 1, wherein the coating has a Rockwell C hardness of 64 to 70.

3. The flowmeter according to claim 1, wherein the coating has a thickness of 0.015 to 0.120 inches.

4. The flowmeter according to claim 1, wherein the surface roughness of the coating is less than or equal to 125 microinches rms.

5. The flowmeter according to claim 1, wherein the first and the second pressure taps are formed by electric discharge machining a hole through said coating and said wall.

6. The flowmeter according to claim 1, wherein the coating has an erosion rate of equal to or less than 0.041 mm$^3$/g (ASTM G76).

7. The flowmeter according to claim 1, wherein the coating has an erosion rate of equal to or less than 0.025 mm$^3$/g (ASTM G76).

8. In a pipeline transporting a flowing erosive slurry, a flowmeter tube having the erosive slurry flowing there through, wherein the flowmeter tube comprises: a wall forming inlet section having a first cross sectional area for receiving the flowing erosive slurry from said pipeline and an outlet section having a second cross sectional area for receiving the flowing erosive slurry from said inlet section;
   said wall having an inside coating of tungsten carbide cemented by a nickel chromium alloy contacting the erosive flowing slurry to protect the wall from erosion by the erosive slurry;
   wherein said coating is autogenously, metallurgically bonded to said wall, has a hardness of 64 to 70 Rockwell C, a surface roughness of less than or equal to 250 microinches rms, and an erosion rate of equal to or less than 0.025 mm$^3$/g (ASTM G76);
   a first pressure tap communicating through said wall and said coating at said inlet section;
   and a second pressure tap communicating through said wall and said coating at said outlet section;
   wherein said first and said second pressure taps provide pressure data to determine the flow rate of the erosive slurry flowing through the pipeline.

9. The flowmeter according to claim 8, wherein the flowmeter tube is a venturi flowmeter tube.

* * * * *